US012630691B2

(12) United States Patent
Yadav et al.

(10) Patent No.: US 12,630,691 B2
(45) Date of Patent: May 19, 2026

(54) METHODS FOR FORMING DISPERSED CARBON NANOMATERIALS FOR USE IN POLYMER COMPOSITES AND COATINGS

(71) Applicant: Vibrantz Color Solutions LLC, Ashtabula, OH (US)

(72) Inventors: Santosh K. Yadav, Geneva, OH (US); Paul A. Rettinger, Ashtabula, OH (US)

(73) Assignee: Vibrantz Color Solutions LLC, Ashtabula, OH (US)

(*) Notice: Subject to any disclaimer, the term of this patent is extended or adjusted under 35 U.S.C. 154(b) by 15 days.

(21) Appl. No.: 18/429,818

(22) Filed: Feb. 1, 2024

(65) Prior Publication Data

US 2024/0254309 A1 Aug. 1, 2024

Related U.S. Application Data

(60) Provisional application No. 63/482,686, filed on Feb. 1, 2023.

(51) Int. Cl.
*C08K 3/04* (2006.01)
*C08J 3/22* (2006.01)

(52) U.S. Cl.
CPC .............. *C08K 3/041* (2017.05); *C08J 3/226* (2013.01); *C08J 2300/12* (2013.01); *C08J 2300/24* (2013.01); *C08K 2201/001* (2013.01); *C08K 2201/011* (2013.01)

(58) Field of Classification Search
CPC .............. C08K 3/041; C08K 2201/001; C08K 2201/011; C08K 3/04; C08J 3/226; C08J 2300/12; C08J 2300/24
See application file for complete search history.

(56) References Cited

U.S. PATENT DOCUMENTS

| | | | |
|---|---|---|---|
| 2008/0090930 A1 | 4/2008 | Madhusoodhanan et al. | |
| 2010/0286327 A1 | 11/2010 | Moorlag et al. | |
| 2024/0002631 A1* | 1/2024 | Predtechenskiy | ...... C08K 3/041 |

FOREIGN PATENT DOCUMENTS

| | | | |
|---|---|---|---|
| CN | 103627180 A | 3/2014 | |
| CN | 105713235 A * | 6/2016 | .............. C08K 7/24 |
| KR | 20130053015 A | 5/2013 | |

OTHER PUBLICATIONS

International Search Report and Written Opinion issued in PCT application No. PCT/US24/13964, mailing date May 24, 2024.

* cited by examiner

*Primary Examiner* — Mark Kopec
*Assistant Examiner* — Jaison P Thomas
(74) *Attorney, Agent, or Firm* — Benesch Friedlander Coplan & Aronoff LLP

(57) ABSTRACT

The present disclosure describes methods of deagglomerating, debundling, dispersing, and functionalizing carbon nanomaterials in a medium using a process that does not damage the properties of the carbon nanomaterials. Three exemplary types of carbon nanomaterials are conductive carbon black, graphene, and carbon nanotubes (CNT), including single-wall carbon nanotubes (SWCNT). Once the carbon nanomaterials are dispersed in the medium, the resulting carbon nanomaterial dispersion can be subjected to further processing or blended with additional components to form a coating or polymer composite material suitable for molding structural components. The dispersed carbon nanomaterial can provide the resulting part or component with desirable mechanical and electrical properties such as static dissipation and conductivity.

17 Claims, 7 Drawing Sheets

METHODS FOR FORMING DISPERSED CARBON NANOMATERIALS FOR USE IN POLYMER COMPOSITES AND COATINGS

RELATED APPLICATIONS

This application claims benefit of U.S. Provisional Application 63/482,686 filed Feb. 1, 2023, which is hereby incorporated in its entirety.

FIELD OF INVENTION

The present disclosure generally relates to novel methods and systems for deagglomerating, debundling, dispersing, and functionalizing carbon nanomaterials into a medium to form useful carbon nanomaterial dispersions for blending with additional components to form masterbatches, which are useful in forming composite materials and coatings. More specifically, the present disclosure relates to novel methods and systems for forming carbon nanomaterial dispersions with: (i) a multiplicity of zero-dimensional, one-dimensional, two-dimensional, and/or three-dimensional carbon nanoparticles and (ii) conductive and static dissipative properties, where such carbon nanomaterial dispersions are subsequently blended with additional components to from masterbatches that are then used to form polymer composite materials that are useful for forming products and coatings.

BACKGROUND

Recently, considerable interest has grown in the electrical benefits of nanocarbon-based thermally reactive composites and coatings using carbon nano materials such as carbon nanotubes (CNT) to achieve electrostatic dissipative (ESD) and conductive characteristics. However, it has proven to be difficult to handle carbon nanotubes and other similar nanomaterials and subsequently deagglomerate, debundle, and disperse such carbon nanomaterials in media to form functional coatings and/or composite materials. For example, typically, to form a functional carbon nanotube composite, coating, or thermoplastic material, dry carbon nanotube powder is added to a liquid or melted resin mix under agitation. Carbon nanotube dry powder is very light, fluffy, and tends to go airborne in the presence of minimal air current or draft. Not only is this a loss of potentially valuable material affecting quality, but it is also an environmental, health, and safety concern. Too much combustible airborne powder can pose an explosion hazard, and air-borne carbon nanotube particles may pose a health risk to humans. Another issue is that adding CNT to a resin mix under agitation does not typically provide sufficient shear to achieve uniform dispersion of carbon nanotubes. Still a third issue with adding CNT to a resin mixture is the question of processability. Very often, viscosity will increase with time under agitation, leading to the composite resin matrix becoming too high in viscosity for processing.

Typical physical and chemical dispersion techniques for the processing of carbon nanotube composites include ultrasonication, ball milling, etc., but these methods can cause irreversible damage to the carbon nanotubes. Other methods such as mechanical mixing, magnetic stirring, and shear intensive stirring impart less damage on the carbon nanotubes; however, such methods often leave the carbon nanotubes bundled. This is especially true of a specific class of carbon nanotubes referred to as single-wall carbon nanotubes (SWCNT).

Accordingly, because of the above imperatives, there is a need in the industry for repeatable methods for deagglomerating, debundling, dispersing, and functionalizing carbon nanomaterials in liquid or thermoplastic media to form novel carbon nanomaterial dispersions, which are subsequently combined with additional components to form novel masterbatches that are useful in forming polymer composite materials used to form products and coatings with consistent and useful physical properties. Such methods are disclosed herein.

SUMMARY

The present disclosure describes several aspects for methods of deagglomerating, debundling, dispersing, and functionalizing carbon nanomaterials such as carbon nanotubes in a medium without damage to the properties or structure of the carbon nanomaterials. Once the carbon nanomaterials are dispersed in the medium, the resulting carbon nanomaterial dispersion can be blended with other components to form a masterbatch. Such masterbatches can be subsequently combined with additional components to form polymer composite materials and/or coatings that are designed for use in various manufacturing processes for the purpose of producing coatings or specific structural components that are useful in commercial applications (e.g. pick-up truck boxes, battery enclosures, ladder rails, marine coatings, ESD floor coatings, etc.). The use of the carbon nanomaterial dispersion in masterbatches and subsequent composite materials can provide a molded component or coating with desirable mechanical and electrical properties such as static dissipation and conductivity. In one example, the carbon nanomaterials are mixed with additional components using a planar milling process to form the carbon nanomaterial dispersion. Such a process deagglomerates, debundles, and disperses the nanomaterials in the medium without damaging the nanomaterials. The resulting carbon nanomaterial dispersion can be mixed with additional components such as a polyester resin and carbon black using turbine milling processes to form a masterbatch. Such a masterbatch can then be blended with other components to form a composite or coating material for coatings, molding components, molding products, and the like. Examples of composite materials that are formed by the described processes include, but are not limited to, sheet molding compound, bulk molding compound, injection molding compound, caterpillar molding compound, compression molding compound, wet mix, resin infusion, prepreg, and the like. Such composite materials are useful in a variety of manufacturing processes such as injection molding, pultrusion, compression molding, extrusion, sheet molding, form molding, and the like.

BRIEF DESCRIPTION OF THE DRAWINGS

In the accompanying drawings, structures are illustrated that, together with the detailed description provided below, describe example aspects of the disclosed systems, methods, and apparatus. Where appropriate, like elements are identified with the same or similar reference numerals. Elements shown as a single component can be replaced with multiple components. Elements shown as multiple components can be replaced with a single component. The drawings may not be to scale. The proportion of certain elements may be exaggerated for the purpose of illustration.

DETAILED DESCRIPTION

Figure 1:
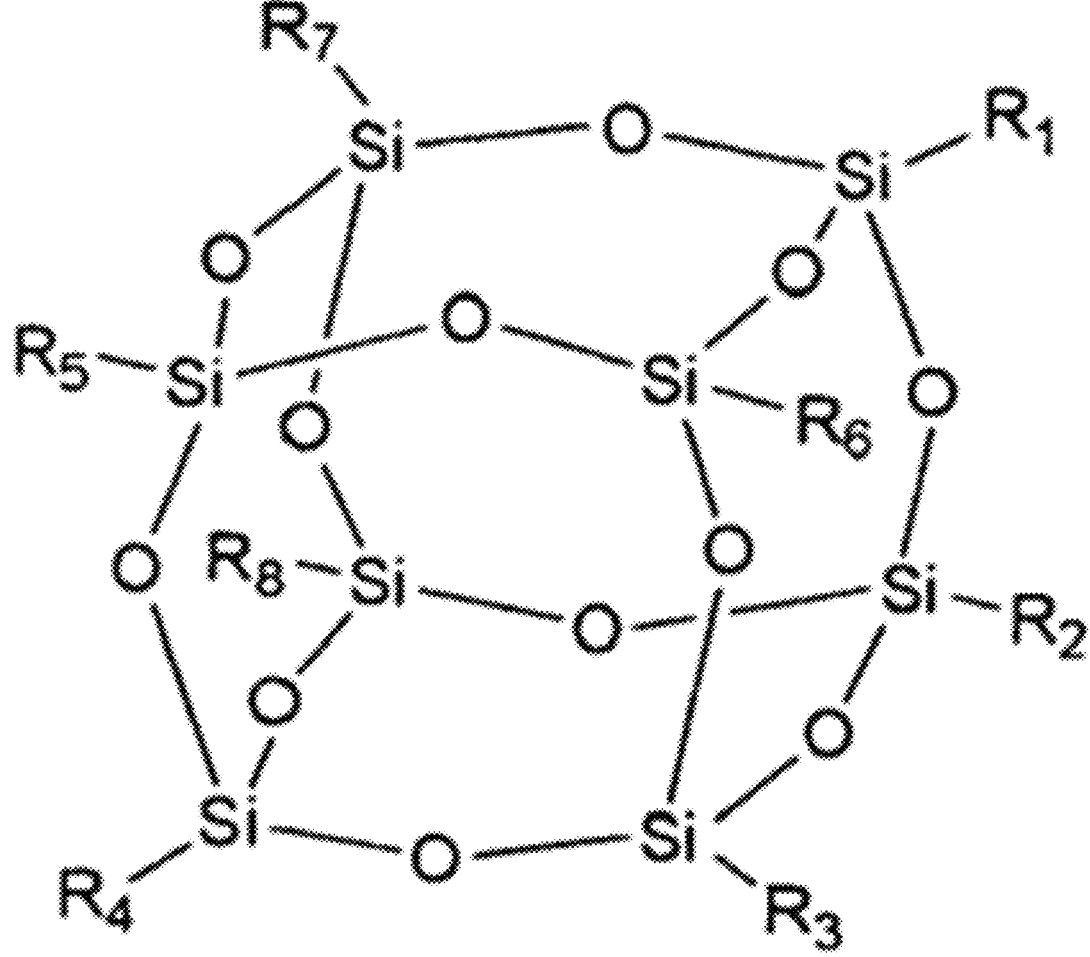
FIG. 1 schematically illustrates the core chemical structure of polyhedral oligomeric silsesquioxane (POSS).

The present disclosure describes several aspects for methods of deagglomerating, debundling, dispersing, and functionalizing carbon nanomaterials in a medium using a process that does not damage the properties of the carbon nanomaterials. Three exemplary types of carbon nanomaterials are conductive carbon black, graphene, and carbon nanotubes (CNT), including but not limited to, single-wall carbon nanotubes (SWCNT). Once the carbon nanomaterials are dispersed in the medium, the resulting carbon nanomaterial dispersion can be subjected to further processing, and/or blended with additional components to form a coating and/or polymer composite material suitable for molding structural components. The dispersed carbon nanomaterial can provide the resulting part or component with desirable mechanical and electrical properties such as static dissipation and conductivity. The chemical components used to form the carbon nanomaterial dispersion can be blended using a planar milling process such as a two-roll or three-roll milling process. The chemical components used to form a masterbatch to can be blended using a mix process followed by turbine milling process. Depending upon the specific application, this masterbatch may then be used at loadings of roughly 0.01 to 50% of resin content in coatings and/or composite formulation comprised of resins, polymers, monomers, fillers, additives, etc.

In one aspect, the invention fully describes a method of making a stable carbon nanomaterial dispersion for use in forming a masterbatch that includes the steps of: combining a plurality of carbon nanomaterials with a liquid medium and a polyhedral oligomeric silsesquioxane derivative; and blending the components using a planar milling processes to form a carbon nanomaterial dispersion.

In one aspect, the method of making a stable carbon nanomaterial dispersion includes but is not limited to C12-14 aliphatic monoglycidyl ether, trimethylopropane triacrylate, polyester resin, plasticizer, melted liquid polyethylene, xylene, styrene, tert-butyl styrene, polypropylene glycol, and/or PM acetate.

In one aspect, the method of making a stable carbon nanomaterial dispersion so that the polyhedral oligomeric silsesquioxane derivative includes but is not limited to trans-cyclohexandiol isobutyl POSS, aminopropyl isobutyl POSS, glycidyl POSS, glycidyl polyethyleneglycol POSS, and/or polyethyleneglycol POSS.

In one aspect, the method of making a stable carbon nanomaterial dispersion so that the plurality of carbon nanomaterials includes carbon nanotubes.

In one aspect, the method of making a stable carbon nanomaterial dispersion when the plurality of carbon nanomaterials includes single-walled carbon nanotubes.

In one aspect, the method of making a stable carbon nanomaterial dispersion so that the ratio of components is 70%-90% aliphatic monoglycidyl ether or ester, 1%-20% polyhedral oligomeric silsesquioxane derivatives, and 1%-15% carbon nanomaterials.

In one aspect, the invention comprises a method of using a planar milling process to obtain optimum electrical conductivity using carbon nanomaterials for thermoset composite and coatings applications.

In one aspect, the method of using a planar milling process is a two-roll milling process or a three-roll milling process.

In one aspect, the method of using a planar milling process further includes steps of: combining the carbon nanomaterial dispersion with a thermosetting resin and carbon black; and blending the components to form a polymer composite material to form a masterbatch.

In one aspect, the method of using a planar milling process forms a thermosetting resin that is a polyester resin.

In one aspect, the method of using a planar milling process uses a ratio of components is approximately 25%-94.95% thermosetting resin, 5%-25% carbon black, and 0.05%-50% of the carbon nanomaterial dispersion.

In one aspect, the method of using a planar milling process uses a turbine milling process is used to enhance debundling and exfoliation in support of improved compatibility and electrical properties as used in a polymer composite material;

In one aspect, the method of using a planar milling process, the additional high-shear mixing is used to enhance debundling and exfoliation in support of improved compatibility and electrical properties as used in a polymer composite material.

In one aspect, the method of using a planar milling process, the resulting masterbatch includes a multiplicity of zero-dimensional, one-dimensional, two-dimensional, and/or three-dimensional carbon nanoparticles.

In one aspect, the method of using a planar milling process the resulting masterbatch may be used in concentrations of 0.05% to 50% based upon the thermosetting resin used to produce a polymer composite material of ESD and/or electrically conductive characteristics.

In one aspect, the method of using a planar milling process the resulting polymer coating and/or composite material includes conductive properties.

In one aspect, the method of using a planar milling process the resulting polymer coating and/or composite material includes static dissipative properties.

The apparatus, systems, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, method, etc. are either related to a specific example presented or are merely a general description of such a technique, arrangement, method, etc. Identifications of specific details or examples are not intended to be and should not be construed as mandatory or limiting unless specifically designated as such. Selected examples of apparatus, arrangements, and methods for forming carbon nanomaterial dispersions of deagglomerated, debundled, dispersed, and functionalized carbon nanotubes and blending such carbon nanomaterial dispersions with additional components to form dispersions and/or masterbatches as described above are hereinafter disclosed and described in detail with reference made to FIGS. 1-7.

It is desirable to form masterbatches or concentrates of carbon nanomaterials that are deaggregated, debundled, and dispersed in a medium for subsequent addition and combination with other components to form coatings and/or polymer composite materials useful in molding various structural components, and products. However, in the prior art, there are challenges posed in forming masterbatches. In the preparation of a dispersion, masterbatch, or concentrate, there are two typical issues that cause concern. The first is the difficult task of dispersing carbon nanomaterial, which requires the breaking apart and dispersion of relatively large (micron-scale) agglomerates into much smaller particles and bundles in the range of hundreds of nanometers average particle size. The second issue is the question of exfoliation or debundling of small particles and agglomerates of strands that are tied together by a variety of forces, especially π-π and van der Waals interactions. Carbon nanomaterials form bundles held together by π-π and van der Waals interactions are generally insoluble and not readily dispersed into monomers, polymers and solvents. This poses a fundamental processing challenge. The apparatus, systems, arrangements, and methods disclosed herein use carbon nanotubes as an exemplary carbon nanomaterial. However, it will be understood that such apparatus, systems, arrangements, and methods apply equally to other carbon nanomaterials such as, for example, fullerenes, quantum dots, graphene, and nanodiamonds and nanohorns. As known in the art, such nanomaterials can be arranged as zero-dimensional, one-dimensional, two-dimensional, or three-dimensional in physical structure. All such structures apply to the disclosure herein.

In order to obtain optimum gain in electrical, mechanical, or other properties from the use of carbon nanotubes, it is desirable to achieve a stable, high level of dispersion and debundling. Additionally, a dispersion that includes a multiplicity of zero-dimensional, one-dimensional, two-dimensional, and/or three-dimensional carbon nanoparticles dispersed throughout a medium is desirable. The methods disclosed herein achieve such goals. For purposes of this disclosure, dispersion refers to the process of deagglomerating bundles of carbon nanotubes and dispersing them uniformly into a medium. By contrast, debundling refers to the process of separating bundles of individual strands into smaller bundles and/or individualized strands. The end result must be a generally uniform distribution of nanoparticles throughout a monomer, solvent, and/or polymeric medium.

Typical physical and chemical dispersion techniques for the processing of carbon nanomaterials include ultrasonication, ball milling, etc., but these methods can cause irreversible damage. Other methods such as mechanical mixing, magnetic stirring, and shear intensive stirring impart less damage; however, such methods often leave carbon nanoparticles bundled. This is especially true of a specific class of carbon nanotubes referred to as single-wall carbon nanotubes (SWCNT).

Novel methods for dispersing or deagglomerating large (micron scale) bundles of carbon nano, including CNT and SWCNT, include planar milling processes such as three-roll (or two-roll) milling. Use of a planar milling process reduces the damage to carbon nanomaterial particles, while allowing for efficient deagglomeration. However, a much more difficult task is to overcome π-π and van der Waals interactions by any form of milling or dispersion. A common problem for material compounders is that when carbon nanotubes (masterbatched or dry) are introduced into a coatings or composite formulation at sufficiently high loading as to achieve desired electrical conductivity, the viscosity of the compound becomes so high that it is difficult if not impossible to mix or process. Such conditions can cause mixers and other equipment to become unusable to mix the masterbatch. This is due to the surface area of carbon nanomaterials compared to its overall weight or volume, which is very high and increases exponentially as small agglomerates begin to debundle.

An example of a typical masterbatch formulation used in this manner would be as follows: A low viscosity carrier resin or plasticizer: 90% w/w; and SWCNT: 10% w/w. In this example, the low viscosity carrier vehicle might be a plasticizer, such as dioctyl terephthalate, or a reactive resin, such as Aropol MR 17060, Polylite 32645-00, Multranol 3900, or a monofunctional epoxy diluent such as C12-14 aliphatic monoglycidyl ether (e.g. Heloxy 8, Chemmod8, Epodil 748, etc.), to list a few commercially available examples (out of many possibilities). Regarding the carbon nanotubes, an example of interest might include: Nano Carbon Matrix 2005-404 (MWCNT), from Interprome; and/or Tuball® (SWCNT), from OCSiAl, American Elements (SWCNT) to list a few out of many possible examples. An example of a mixture or compound that would exhibit the described difficulties is listed in the table below.

| Bis A epoxy resin (e.g. YD 128, Epon 828) | 90.00 parts by weight (ppw) |
| C12-14 aliphatic monoglycidyl ether | 10.00 ppw |
| SWCNT | 00.10 ppw |
| Diethylene tetramine (e.g. D.E.H. 24) | 12.45 pw |

One issue with the described example, is the problem of incorporating SWCNT into the batch. SWCNT are very light and fluffy, and during the incorporation process, particles readily become airborne, causing loss of material and deficiencies to quality, in addition to environmental, health, and safety concerns. Another issue is the very low weight of material being added. In a production environment, it is difficult if not impossible to accurately weigh such a small quantity of material into a mixing or compounding process. Accordingly, as mentioned above, material compounders have made use of masterbatches of carbon nanotubes to help reduce or eliminate airborne particles and/or weighing issues into their process. An example of a mixture or compound incorporating the masterbatch is listed in the table below.

| Bis A epoxy resin (e.g YD 128, Epon 828) | 90.00 parts by weight (ppw) |
| C12-14 aliphatic monoglycidyl ether | 10.00 ppw |
| 10% SWCNT masterbatch | 1.00 ppw |
| D.E.H. 24 (epoxy curative) | 12.51 ppw |

In the above case, the 10% SWCNT masterbatch would likely be comprised of 90% C12-14 aliphatic monoglycidyl ether, and 10% Tuball (SWCNT). There are masterbatch formulations similar if not identical to this that are commercially available in the market (e.g. Matrix 203 from OCSiAl). By employing the commercially available masterbatch, the compounder is able to avoid the issues of airborne particles, and of weighing and controlling extremely small quantities of dry carbon nanotubes into their process. However, significant challenges remain, including issues of high viscosity.

As previously noted, carbon nanomaterials, and especially SWCNTs, can be extremely high in surface area. In comparison, carbon black, a pigment commonly used in plastics and coatings, may have a typical particle size of 84 nanometers (nm) diameter and a surface area of roughly 60 square meters per gram (m²/g). An extremely fine grade of carbon black, used in automotive exterior coatings, at the extreme end of carbon black, may have a mean particle of 9 nm and a surface of 550 m²/g. Such carbon black pigments are typically considered to be extremely light, fluffy, and difficult to wet and disperse materials. By contrast, in dispersions using carbon nanotubes, surface area of the carbon nanotubes can excess of 7000 m²/g are common. So when a masterbatch dispersion of carbon nanotubes is added to a formulation in the manner described, one consequence that is nearly if not entirely unavoidable, is the issue of viscosity increase to the point of material will not flow and becomes unprocessible (this is similar to one of the problems of adding CNT dry). In some instances, viscosity can be so high as to damage and destroy mixing and other processing equipment. For processing methods where viscosity does not increase to the point that it is no longer processible, this typically means that the carbon nanotubes are not incorporated to the level that will allow for desired properties, especially static dissipative conductivity.

One way that material compounders have attempted to overcome this issue is by addition of dispersants or surfactants to their compound. To some degree, this process helps, by wetting out the carbon nanotubes, and thereby reducing the viscosity of the mixture. However, the drawback to wetting out carbon nanotubes is that point-to-point contact between debundled strands or particles can be sterically blocked. Consequently, the surfactant or dispersant chemistry used can be of critical importance to achieving electrical conductivity in the final application.

One class of molecule that is effective as a dispersant is polyhedral oligomeric silsesquioxane (POSS). The chemical structure of POSS is illustrated in FIG. 1. POSS, or is a type of inorganic three-dimensional nanostructured Si—O cage (formula [RSiO1.5]n, where n=8, 10 and 12) surrounded by various organic groups with an overall diameter of 1-3 nm. Having eight organic groups surrounding a cage-like core connected by Si—O—Si bonds, POSS is highly soluble in many organic/inorganic solvents. POSS molecules exhibit compatibility with other organic and inorganic molecules depending on the specific structure and substituents of the POSS. However, achieving a carbon nanotube dispersion using POSS is not a straightforward process, and the process by which carbon nanotubes is introduced to POSS is very important. Control of chemical and physical interactions between the nanotubes and POSS molecules is crucial. An example of how POSS might be used by a material compounder is listed in the table below.

| Bis A epoxy resin (e.g YD 128, Epon 828) | 90.00 parts by weight (ppw) |
| C12-14 aliphatic monoglycidyl ether | 10.00 ppw |
| 10% SWCNT masterbatch | 1.00 ppw |
| POSS (epoxy functional) | 0.10 ppw |
| D.E.H. 24 (epoxy curative) | 12.51 ppw |

Adding POSS to an epoxy system to which a SWCNT masterbatch is added can help viscosity to a level that allows the material to remain processable. However, because the POSS is not incorporated into the dispersion of the masterbatch, optimal properties for viscosity and loading required for ESD are not achieved.

This disclosure describes efficient and scalable methods of dispersing carbon nanotubes with the use of a surfactant or "hyperdispersant. The carbon nanotubes loading in hyperdispersant range from 0.01% to 15% wt %. POSS chemistries are combined with carbon nanotubes and SWCNT using high shear mixing such as two roll or three roll mills. Examples of compositions tested are described below.

| Description | PPW | PPH |
|---|---|---|
| SWCNT | 40.000 | 6.897 |
| C12-14 aliphatic monoglycidyl ether | 480.000 | 82.759 |
| POSS (epoxy functional) | 60.000 | 10.345 |
| Paste Subtotal Prethickener | 580.000 | 100.00 |

| Description | PPW | PPH |
|---|---|---|
| SWCNT | 60.000 | 10.000 |
| C12-14 aliphatic monoglycidyl ether | 480.000 | 80.000 |
| POSS (epoxy functional) | 60.000 | 10.000 |
| Paste Subtotal Prethickener | 600.000 | 100.000 |

| Description | PPW | PPH |
|---|---|---|
| SWCNT | 60.000 | 10.000 |
| Plasticizer, Monomer, or Reactive Diluent | 520.000 | 90.000 |
| Paste Subtotal Prethickener | 600.000 | 100.000 |

In the above example, some possible plasticizers include dioctyl terephthalate, dioctyl sebacate, or dibutyl phthalate, while some possible monomers or diluents include trimethylolpropane diacrylate (for unsaturated cure) or C12-14 aliphatic monoglycidyl ether (for epoxide polymerizations).

Two factors to consider for debundling carbon nanotubes and dispersion are: applied shear stress and dispersion chemistry. Shear stress is required for debundling, whereas a good and effective additive environment stabilized carbon nanotubes and prevents reagglomerating due to high Van der Waals forces. With these considerations in mind, carbon nanotubes are mixed into a solution of additives and monomers, polymers, solvents using a flat blade. This suspension can be then processed with a two-roll mill or a three-roll mill. Following are some examples of making use of carbon nanotube dispersions to achieve electrical properties in composite formulations.

In general, the dry carbon nanotubes were incorporated into a resin matrix under high shear agitation, and subsequently dispersed via high shear mixing such as three-roll and two-roll mixing, in such a manner as to avoid introduction of undesired defects. Such a method can be achieved in stages:

The first stage is incorporation of carbon nanomaterials into a liquid medium. For example, both carbon nanotubes and SWCNT are extremely light and fluffy materials. Even as a container of carbon nanotubes is opened, very small air currents are likely to cause small light agglomerates of carbon nanotubes to become airborne. Thus, introduction of carbon nanotubes to a liquid resin or solvent, prior to and during mixing, must be performed under carefully controlled conditions. One method for preparing premixes of carbon nanotubes and liquids (resin, monomer, additives) suspension is to use a Cowles blade at minimal speed agitation (100-300 revolutions per minute, using mix blade ⅓ diameter of mix container. An exemplary process is as follows: (1) weigh 90 parts by weight of resin into a mix container; (2) attach the mix container to a mixer in a fume hood with carefully controlled air flow; (3) agitate at low speed; (4) pre-weighed carbon nanotubes for addition to the batch under conditions of minimal air flow; and (5) add carbon nanotubes to the batch under minimal agitation until incorporated.

Mixing in the early stages of processing is maintained at a very low shear, as this will expose higher surface area, and cause the viscosity and thixotropy of the mixture to increase significantly. Due to the high surface area of carbon nanotubes, excessive viscosity and thixotropy in the mix process will inhibit or prevent successful incorporation of dry carbon nanotubes into the liquid phase mixture. Flat bladeless disks can be used on the mixer or a paint shaker can be used in place of the mixer, which can reduce the quantity of shear to which a batch is exposed during the incorporation of carbon nanotubes into the liquid. Any mix technique may be utilized, including but not limited to planetary mixer, ribbon blender, etc., as long as the shear at this stage is kept minimal. The dispersant or POSS is typically present in the liquid mixture at the time that the carbon nanotubes are introduced. This occurs prior to deagglomeration, debundling, and dispersion, for effective results.

Figure 2:
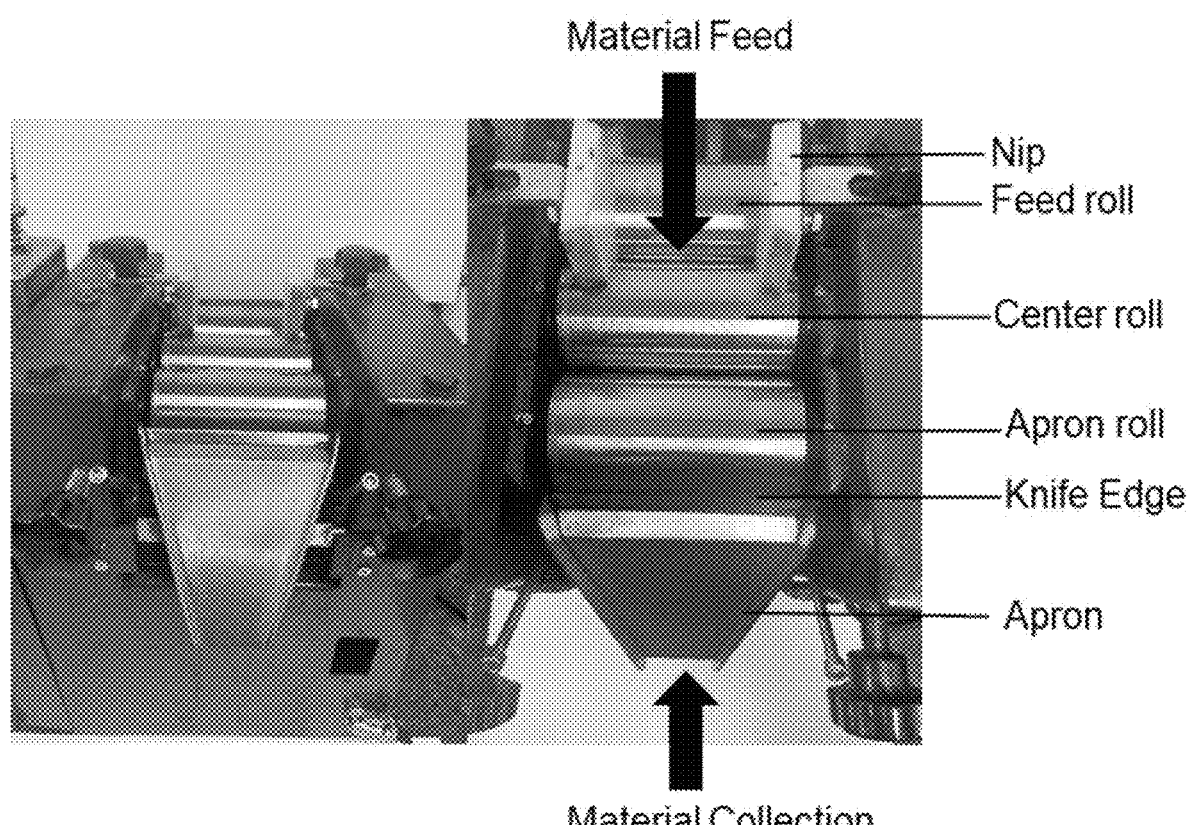
FIG. 2 is an image of a three-roll mill.
Figure 3:
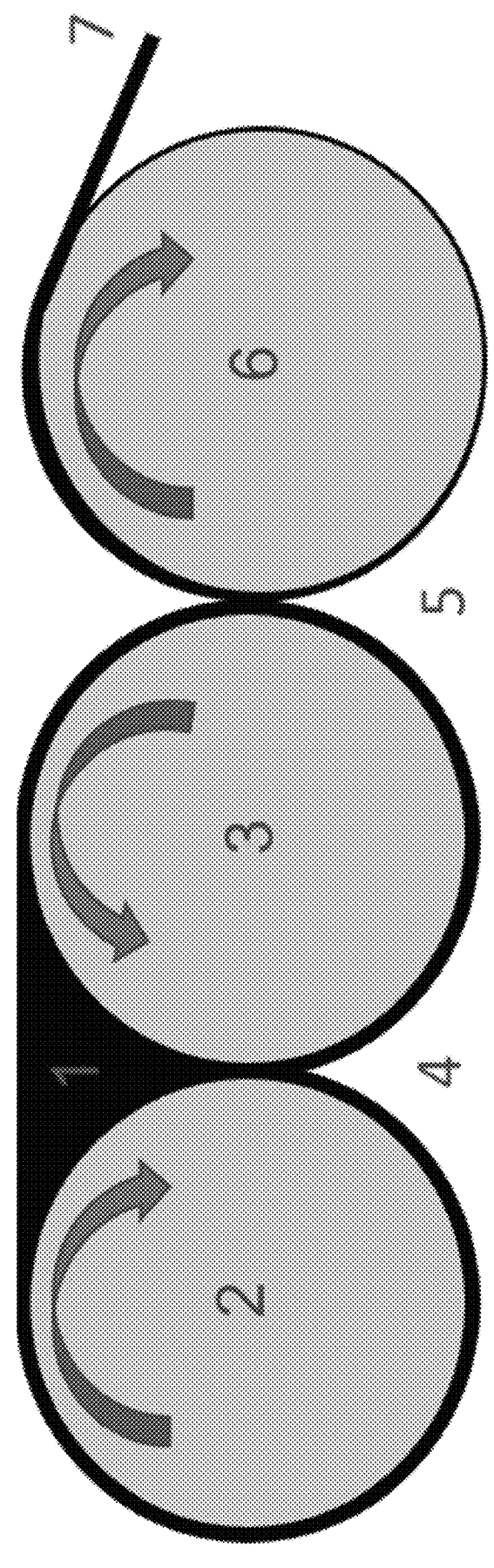
FIG. 3 is a schematic illustration of a three-roll mill.

The second stage is the deagglomeration, debundling, and dispersion of carbon nanotubes. This can be achieved through the use of a three-roll mill. FIG. 2 is an image of a three-roll mill. The material feed, or "nip" region is near the back of the mill; there are three rolls (a feed roll, center roll, and apron roll) located between the back of the mill and the front; and the apron is located at the very front of the mill where processed material is collected at the end of the process. FIG. 3 is a schematic illustration of a three-roll mill. The mixture is fed into the feed region (1) between the feed roll (2) and the center roll (3). This is the area that is sometimes referred to as the "nip" area due to its location between two nips on either side. Initially, the bulk of the material remains in the feed region while small amounts pass through the first high-shear nip (4) and remain adhered to the rollers as they are alternatively recirculated into the feed region by the feed roll or advanced to the second nip (5) by the center roll. After passing through the second nip, the material is again either recirculated into the feed region by the center roll or adheres to the apron roll (6) and is removed by the knife edge of the apron (7) for collection and quality control.

Following the mix stage, there are four parameters that influence the outcome of a planar milling process (e.g. processing through a three-roll mill) in which nanotubes are deagglomerated, debundled, and dispersed: (i) the rotating tip speed of the rolls; (ii), the gap between the rolls; (iii) the resultant shear rate arising as a combination of the tip speed and gap between the rolls; and (iv) the number of times that the material passes between each of the rolls and is deposited upon, the apron. For three-roll mill processing, the maximum shear is occurred in the regions between adjacent rollers, known as the nips. The nip width can be adjusted to balance the need for throughput of thick flakes and high applied shear stresses.

Liquid masterbatches as described above can be introduced to the feed area of the three-roll mill and processed for three passes using a three-roll mill as shown in FIG. 3. The tip speed, and therefore, the shear rates obtained are of importance, which, depending upon the roll and the gap distance, such shear rates can vary between 100 $s^{-1}$ and 600000 $s^{-1}$.

In one example, stable SWCNT dispersions can be blended with epoxy resin in varying proportion (90 to 5000 ppm w/w) and cured using triethylene tetramine at 1:1 equivalent stoichiometry. Sample can be prepared in a 2-inch diameter petri dishes, and twenty-mil (20-mil) draw-downs can be prepared on Leneta charts. Samples can be cured at 65° C.

Test methods for determining electrical resistivity of samples include: (1) cured samples are measured for thickness via digital calipers and sandwiched between two 75 mm square copper plates, where the plates were coated with an electrically conductive adhesive to assure uniform contact, electrodes were attached to the copper plates, and resistivity measurements are taken with a Ransburg resistivity meter; and (2) for cured drawdowns, electrodes were connected to the panels via electrical adhesive, approximately four cm apart, and resistivity measurements were taken. Two examples of instruments that can be used include the aforementioned Ransburg and a Sperry model DM-350A.

Figure 4:
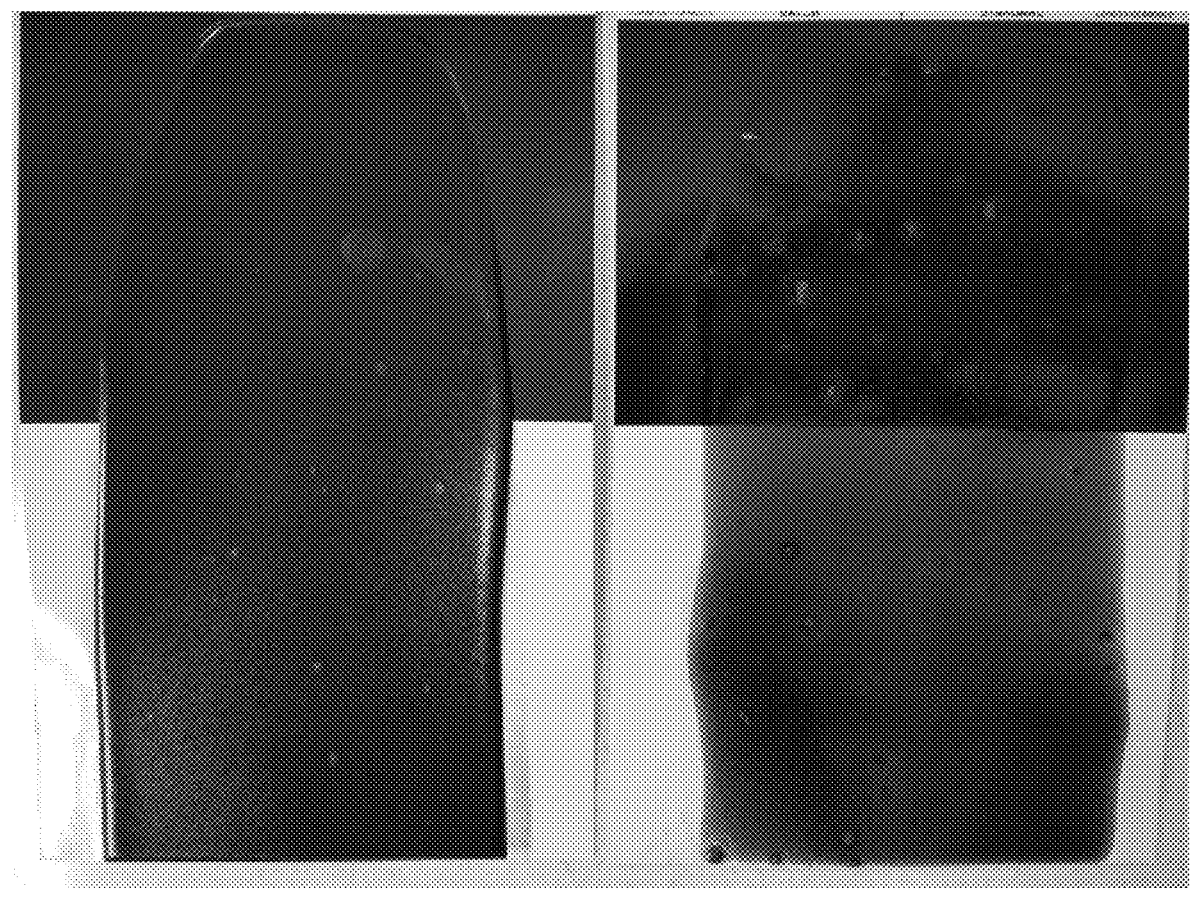
FIG. 4 depicts images of two drawdowns prepared using exemplary methods.

Two images of drawdowns of a SWCNT hyperdispersant in polymer composite prepared used exemplary methods are depicted in FIG. 4 (Sample 1 on the left and Sample 2 on the right). Results for certain characteristics are illustrated below for these samples.

The table below illustrate resistivity of several samples of SWCNT hyperdispersant in polymer composites prepared with varying percentages of carbon nanotubes.

| Sample 1 Summary | | | Sample 2 Summary | | |
|---|---|---|---|---|---|
| Sample Info | Resistivity | | Sample Info | Resistivity | |
| % CNT | Ω/cm | Ω/cc | % CNT | Ω/cm | Ω/cc |
| 0.100% | 2.18E+04 | 5.90E+02 | 0.100% | 2.93E+06 | 7.81E+04 |
| 0.150% | 1.62E+04 | 4.34E+02 | 0.150% | 3.75E+05 | 1.10E+04 |
| 0.200% | 1.67E+04 | 4.87E+02 | 0.200% | 2.49E+05 | 6.99E+03 |
| 0.250% | 8.20E+03 | 2.29E+02 | 0.250% | 9.65E+04 | 2.74E+03 |
| 0.300% | 7.65E+03 | 2.13E+02 | 0.300% | 1.64E+04 | 4.82E+02 |

Figure 5:
FIG. 5 is a graph illustrating the relationship between resistivity and concentration of SWCNT in epoxy composites.

FIG. 5 depicts a graph illustrating the relationship between resistivity and concentration of SWCNT in epoxy composites, with sample 2 shown in red (the top line) and sample 1 shown in green (the bottom line).

Figure 6:
FIG. 6 is graph illustrating the relationship between resistivity and concentration of SWCNT in epoxy composites.

FIG. 6 depicts a graph further illustrating the relationship between resistivity and concentration of SWCNT in epoxy Composites, with sample 2 shown in red (the top line) and sample 1 shown in green (the bottom line).

Figure 7:
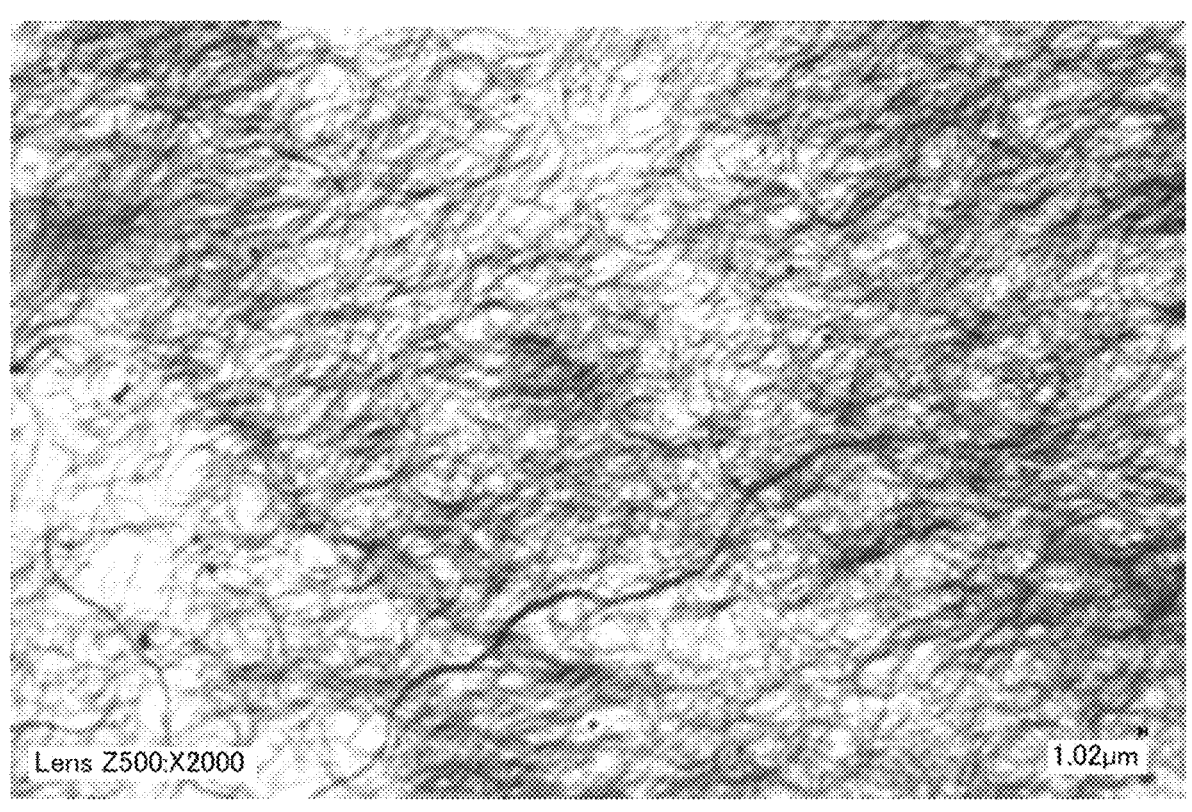
FIG. 7 is a microscopic image of SWCNT bundles.

FIG. 7 is a microscopic image of SWCNT bundles. The image is a 2000 times microscopic image of SWCNT dispersion and is provided, via optical transmission of visible light. The scale is shown in the lower left. The SWCNT shown in this image is concentrated at 0.4% by weight in aqueous suspension.

In another aspect, a carbon nanotube dispersion is formed with the intent to subsequently blend the carbon nanotube dispersion with additional components to form a master-batch for subsequent blending with additional components to form a coating and/or polymer composite material useful in molding or otherwise forming structural components and other products. In one example, the carbon nanotube dispersion comprises SWCNT, C12-14 aliphatic monoglycidyl ether, and POSS in the ratios listed in the table below. The components are combined using high shear mixing using either a two roll mill or three roll mill, which achieves the desired deagglomerating, debundling, and dispersing of the SWCNT.

| Description | PPW | PPH |
|---|---|---|
| SWCNT | 60.000 | 10.000 |
| C12-14 aliphatic monoglycidyl ether | 480.000 | 80.000 |
| POSS (epoxy functional) | 60.000 | 10.000 |
| Carbon nanotube dispersion | 600.000 | 100.000 |

Referring to the C12-14 aliphatic monoglycidyl ether, it is appreciated that any appropriate organic hydrocarbon may be substituted for C12-14 aliphatic monoglycidyl ether to sufficiently form the carbon nanotube dispersion. Further, in one aspect of the invention, carbon nanotubes are combined with a functionalized polyhedral oligomeric silsesquioxane in a nonaqueous medium. It is appreciated however, that carbon nanotube dispersions, according to the invention, when combined with a functionalized polyhedral oligomeric silsesquioxane in an aqueous medium as well or without a liquid medium at all.

Once these components are combined such that the SWCNT are sufficiently deaggregated, debundled, and dispersed, this carbon nanotube dispersion is combined with additional components to a masterbatch. In one example, the carbon nanotube dispersion is combined with a polyester resin and carbon black in the ratios listed in the table below. The carbon nanotube dispersion can be combined with the polyester resin and carbon black using a number of mixing processes such as turbine milling using a blade or other such mixing implement or by basket milling. The resulting masterbatch includes a multiplicity of zero-dimensional, one-dimensional, two-dimensional, and/or three-dimensional carbon nanoparticles dispersed throughout the masterbatch. The masterbatch can be subsequently used as an ingredient to form a polymer composite material suitable for use as a coating or in forming a product using any number of manufacturing processes.

| Description | Percentage |
|---|---|
| Polyester resin, unsaturated | 80.951% |
| Carbon black | 17.41% |
| Carbon nanotube dispersion | 1.639% |
| Polymer composite material | 100% |

The percentages listed in the table above are exemplary only. In other aspects, the percentage of polyester resin can range from 75% to 94.9%, the percentage of carbon black can range from 5% to 25%, and the percentage of carbon nanomaterial dispersion can range from 0.1% to 5%. In some aspects, the percentage of carbon nanomaterial dispersion can range from 0.1% to 2.5%, 0.1% to 2%, 0.1% to 1.9%, 0.1% to 1.8%, 0.1% to 1.7%, 0.1% to 1.6%, 0.1% to 1.5%, 0.1% to 1% or any single numerical descriptor found within these ranges, for example 1.6% or 1.639%, and the carbon black can range from 5% to 20%, from 5% to 15%, from 15% to 20%, or any single numerical descriptor found within these ranges, for example 17% or 17.41%. As the amount of carbon nanomaterial dispersion and carbon black varies in the carbon nanomaterial dispersion, the balance of the composition may be a polyester resin. In some aspects, ratio of components is approximately 50%-94.9% thermosetting resin, 5%-25% carbon black, and 0.1%-25% of the carbon nanomaterial dispersion. In some aspects, an increased or even decreased concentration of carbon nanotube is required. Therefore, compositions, formulated according to aspects of the invention may contain a carbon nanomaterial dispersion within the range from 0.01%, or 0.05% and up to 50%. That is, for a battery enclosure that needs to have static dissipative characteristics, a 10 wt % of carbon nanomaterial dispersion is appropriate, while in other cases, such as introducing CNT in non-aqueous coatings, primarily thermoplastic and thermosetting acrylic, and thermosetting epoxy, to produce coatings for safety applications that are static dissipative, the loading of masterbatch, can go as low as 0.01%—roughly 100 ppm based upon resin solids in the final application. On the other hand, depending on the needs of the resin, an increase in carbon nanomaterial dispersion to 120 ppm of CNT, or 40% of masterbatch based may be required and is encompassed according to an aspect of the invention. Accordingly a method and formulation according to an aspect of the invention may include approximately 25%-94.95% thermosetting resin, 5%-25% carbon black, and 0.05%-50% of the carbon nanomaterial dispersion or any subrange found within this disclosure or specific numeral found within this disclosure or 25%-94.95% thermosetting resin, 5%-25% carbon black, and 0.05%-50% of the carbon nanomaterial dispersion.

It will be understood that the carbon nanomaterial dispersions and masterbatches described herein can be used for a wide variety of coatings and/or composite materials. The dispersions and masterbatches are designed to be used by a manufacturer or processer as they see fit to from a composite materials necessary or desirable to meet the needs of the intended manufacturing process and/or end product produced by such manufacturing process. The dispersions and masterbatches allow manufacturers and processers to use the dispersion or masterbatch as another ingredient in the composite material or other formulation without necessitating any special attention to ensuring that the carbon nanomaterials are dispersed in the resulting composite material. By using the dispersions and/or masterbatches described herein, the resulting polymer composite material includes dispersed zero-dimensional, one-dimensional, two-dimensional, and/or three-dimensional carbon nanoparticles resulting in superior conductivity and static dissipation properties. Such a polymer composite material can be used to mold structural components or coat components where conductive and/or static dissipation properties are important such as battery casings, static-dissipating flooring for industrial applications, automobile components such as bumpers, covers for electric components, and other such components.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

We claim:

1. A method of using a planar milling process to obtain a carbon nanomaterials masterbatch for use in thermoset composite and coating applications, the method comprising:

providing a carbon nanomaterial dispersion prepared by steps of:

combining components comprising a plurality of carbon nanomaterials with a liquid medium and a polyhedral oligomeric silsesquioxane derivative; and blending the components using a planar milling processes to form a carbon nanomaterial dispersion and combining the carbon nanomaterial dispersion with a thermosetting resin and carbon black; and blending the carbon nanomaterial dispersion, thermosetting resin, and carbon black to form a carbon nanomaterial masterbatch including a multiplicity of zero-dimensional, one-dimensional, two-dimensional, and/or three-dimensional carbon nanoparticles.

2. The method of claim 1, wherein a ratio of components is approximately 25%-94.95% thermosetting resin, 5%-25% carbon black, and 0.05%-50% of the carbon nanomaterial dispersion.

3. The method of claim 1, wherein the planar milling process is a two-roll milling process or a three-roll milling process, or a turbine milling process.

4. The method of claim 1, wherein a turbine milling or basket milling process is used in the step of blending the carbon nanomaterial dispersion, thermosetting resin, and carbon black.

5. The method of claim 1, wherein the carbon nanomaterial dispersion comprises 80 parts per hundred (PPH) C12-C14 aliphatic monoglycidyl ether, 10 PPH single wall carbon nanotubes (SWCNT), and 10 PPH polyhedral oligomeric silsesquioxane derivative.

6. The method of claim 1, wherein the carbon nanomaterials of the carbon nanomaterial dispersion are single wall carbon nanotubes (SWCNT).

7. The method of claim 1, further comprising forming a thermosetting resin product comprising the carbon nanomaterial masterbatch of claim 1 in an amount of 0.01% to 50% depending on a final amount of thermosetting resin in the thermosetting resin product, so that the thermosetting resin product has electrically conductive properties.

8. The method of claim 1, further comprising forming a polyester resin by adding the carbon nanomaterial masterbatch of claim 1 to composite materials necessary to form a polyester resin for molding or forming structural components or coatings.

9. The method of claim 1, further comprising forming a coating or a composite material by adding the carbon nanomaterial masterbatch of claim 1 to coating or polymer composite materials to form the coating or the composite material.

10. A method of preparing a polymeric composite material comprising:

deagglomerating, debundling and dispersing carbon nanotubes within a mixture of a liquid medium and a polyhedral oligomeric silsesquioxane derivative to form a carbon nanomaterial dispersion; and blending the carbon nanomaterial dispersion with a polymeric resin that is a thermosetting resin and carbon black to form a polymeric composite material for molding structural components or coatings.

11. The method of claim 10, wherein the polymeric composite material is capable of being used for coatings.

12. The method of claim 10, wherein the step of deagglomerizing, debundling and dispersing the carbon nanotubes within the mixture to form the carbon nanomaterial dispersion occurs by a planar milling process and the step of blending the carbon nanomaterial dispersion with the polymeric resin and carbon black to form the polymeric composite material occurs by a process of turbine milling or basket milling process.

13. The method of claim 10, wherein a ratio of components is approximately 25%-94.95% thermosetting resin, 5%-25% carbon black, and 0.05%-50% of the carbon nanomaterial dispersion.

14. A method of preparing a polymeric composite material comprising:

using a planar milling process to deagglomerize, debundle and disperse carbon nanotubes within a mixture of a liquid medium and a polyhedral oligomeric silsesquioxane derivative to form a carbon nanomaterial dispersion; and using a process of turbine milling or basket milling process to blend the carbon nanomaterial dispersion with a polymeric resin and carbon black to form a polymeric composite material for molding structural components or coatings.

15. The method of claim 14, wherein the polymeric resin is a thermosetting resin.

16. The method of claim 14, wherein the polymeric composite material is capable of being used for coatings.

17. The method of claim 14, wherein a ratio of components is approximately 25%-94.95% polymeric resin, 5%-25% carbon black, and 0.05%-50% of the carbon nanomaterial dispersion.

* * * * *